(12) United States Patent
Matsuki

(10) Patent No.: US 8,284,177 B2
(45) Date of Patent: Oct. 9, 2012

(54) DISPLAY DEVICE AND ELECTRONIC APPARATUS WITH PHOTO-SENSOR SAMPLED SIGNALS AVERAGE

(75) Inventor: Fumirou Matsuki, Chu-Nan (TW)

(73) Assignee: Chimei Innolux Corporation, Chu-Nan (TW)

( * ) Notice: Subject to any disclaimer, the term of this patent is extended or adjusted under 35 U.S.C. 154(b) by 275 days.

(21) Appl. No.: 12/726,291

(22) Filed: Mar. 17, 2010

(65) Prior Publication Data
US 2010/0245309 A1    Sep. 30, 2010

(30) Foreign Application Priority Data
Mar. 27, 2009    (JP) ................ 2009-078267

(51) Int. Cl.
*G06F 3/038* (2006.01)
(52) U.S. Cl. .................................................. 345/207
(58) Field of Classification Search .......... 345/207, 345/211–213; 250/200–239; 257/460; 348/226.1–227.1; 315/150–159; 362/97.1–97.4
See application file for complete search history.

(56) References Cited

U.S. PATENT DOCUMENTS

| | | | | |
|---|---|---|---|---|
| 5,394,171 A | * | 2/1995 | Rabii | 345/213 |
| 6,999,020 B2 | * | 2/2006 | Mizumasa et al. | 341/162 |
| 2008/0204642 A1 | * | 8/2008 | Kobashi | 349/116 |

FOREIGN PATENT DOCUMENTS

| | | |
|---|---|---|
| JP | 2001-522058 | 11/2001 |
| JP | 2007-27210 A | 2/2007 |
| JP | 2008-42886 A | 2/2008 |
| JP | 2008-522159 | 6/2008 |
| JP | 2008-209558 A | 9/2008 |

* cited by examiner

*Primary Examiner* — Liliana Cerullo
(74) *Attorney, Agent, or Firm* — Liu & Liu

(57) ABSTRACT

A display device and an electronic apparatus comprising the same are disclosed. The display apparatus includes a photo-sensor for detecting ambient light and outputting a photocurrent according to the intensity of the ambient light, wherein the display apparatus comprises a current sampling unit and a light detection control unit. The current sampling unit is configured to sample the photocurrent outputted from the photo-sensor and to output a plurality of sampling signals to indicate the magnitude of the photocurrent. The light detection control unit is configured to determine an average of the sampling signals outputted from the current sampling unit. The current sampling unit starts a next sampling period corresponding to the end of one of the sampling signals.

18 Claims, 9 Drawing Sheets

DISPLAY DEVICE AND ELECTRONIC APPARATUS WITH PHOTO-SENSOR SAMPLED SIGNALS AVERAGE

FIELD OF THE INVENTION

The present invention relates to a display device, and more particularly, to a display device including a photo-sensor to output a photocurrent according to the intensity of the detected ambient light and an electronic apparatus comprising the same.

BACKGROUND OF THE INVENTION

Currently, a display device which is applicable to mobile electrical apparatus, such as a vehicle navigation device or a mobile phone, has a brightness regulation function for regulating a display brightness thereof according to the brightness of the ambient light. For example, Japan Patent Publication No. 2001-522058 discloses a display system including a controller to change the brightness of a display according to the ambient light detected by a photo-sensor. By using the brightness regulation function, the brightness of the display is raised under a strong ambient light environment, such as in daytime or being outdoors, and the brightness of the display is reduced under a weak ambient light environment, such as at night or being indoors.

In general, for detecting the ambient light, a display device includes a photo-sensor to detect light and output a photocurrent corresponding to the light-acceptance amount. The photocurrent can be transformed into a digital pulse signal by using a signal converter, such as a current-to-voltage converter or an analog-to-digital converter. A controller regulates the brightness of a backlight source corresponding to the inputted signal. A circuit used for light detecting may be disclosed in JP Patent Pub. No. 2008-522159.

However, considering an indoor environment using a fluorescent lamp with a driving frequency of 50 or 60 Hz, since the light intensity, which is detected by the photo-sensor of the conventional display device including the above-mentioned circuit, varies with the driving frequency of the fluorescent lamp, it is a problem that the output of the photo-sensor also varies with the driving frequency.

SUMMARY OF THE INVENTION

Therefore, an aspect of the present invention is to provide a display device and an electronic apparatus comprising the same for detecting ambient light more precisely.

According to one embodiment of the present invention, the display device includes a photo-sensor for detecting ambient light and outputting a photocurrent according to the intensity of the ambient light, wherein the display device comprises a current sampling unit and a light detection control unit. The current sampling unit is configured to sample the photocurrent outputted from the photo-sensor and to output a plurality of sampling signals to indicate the magnitude of the photocurrent. The light detection control unit is configured to evaluate an average of the sampling signals outputted from the current sampling unit in a predetermined period. The current sampling unit starts a next sampling period corresponding to the end of one of the sampling signals.

Therefore, the photocurrent can be sampled to evaluate the average of the sampling signals, and the length of each sampling period is evaluated by the durations of the sampling signals, thereby detecting ambient light more precisely.

Preferably, the light detection control unit comprises an edge detection unit and a reset signal generating unit, and thus the current sampling unit starts the next sampling period corresponding to the end of one of the sampling signals. The edge detection unit is configured to detect the edges of the sampling signals. The reset signal generating unit is configured to generate a reset signal when the edge detection unit detects the end of one of the sampling signals, thereby allowing the current sampling unit to start the next sampling period. Selectively, the current sampling unit can also comprises a reset signal generating unit configured to detect the ends of the sampling signals and generate a reset signal corresponding to the end of one of the sampling signals, thereby allowing the current sampling unit to start the next sampling period.

Preferably, the light detection control unit comprises a counter, a differential circuit, a memory unit, a timing unit and an averaging unit. The counter is configured to count the number of the starts or the ends of the sampling signals detected by the edge detection unit. The differential circuit is configured to evaluate time differentials between the starts and the ends of the sampling signals detected by the edge detection unit. The memory unit is configured to store the time differentials evaluated by the differential circuit. The timing unit is configured to evaluate the time of the predetermined period when the current sampling unit starts to sample the photocurrent. The averaging unit is configured to evaluate the sum of the time differentials stored by the memory unit in the predetermined period when passing the predetermined period, and to divide the sum into the number counted by the counter, thereby evaluating the average of the sampling signals. Therefore, the photocurrent can be sampled to evaluate the average of the sampling signals.

Preferably, the display device further comprises a brightness control unit configured to regulate display brightness according to the average of the sampling signals evaluated by the light detection control unit. Therefore, the display brightness can be regulated according to the light intensity detected by the photo-sensor.

Furthermore, the display device is a transmissive or transflective liquid crystal display (LCD) comprising a backlight source, or an organic light emission diode (OLED) display using self-emission type OLED devices.

The display device according to one embodiment can be applicable to electrical apparatus for detecting the ambient light, such as a mobile phone, a personal digital assistant (PDA), a vehicle navigation device, a mobile game console or a display device disposed outdoors.

Therefore, the display device and an electronic apparatus comprising the same of the present invention can detect the ambient light more precisely.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

In order to make the illustration of the present invention more explicit and complete, the following description is stated with reference to FIG. 1 through FIG. 8.

Figure 1:
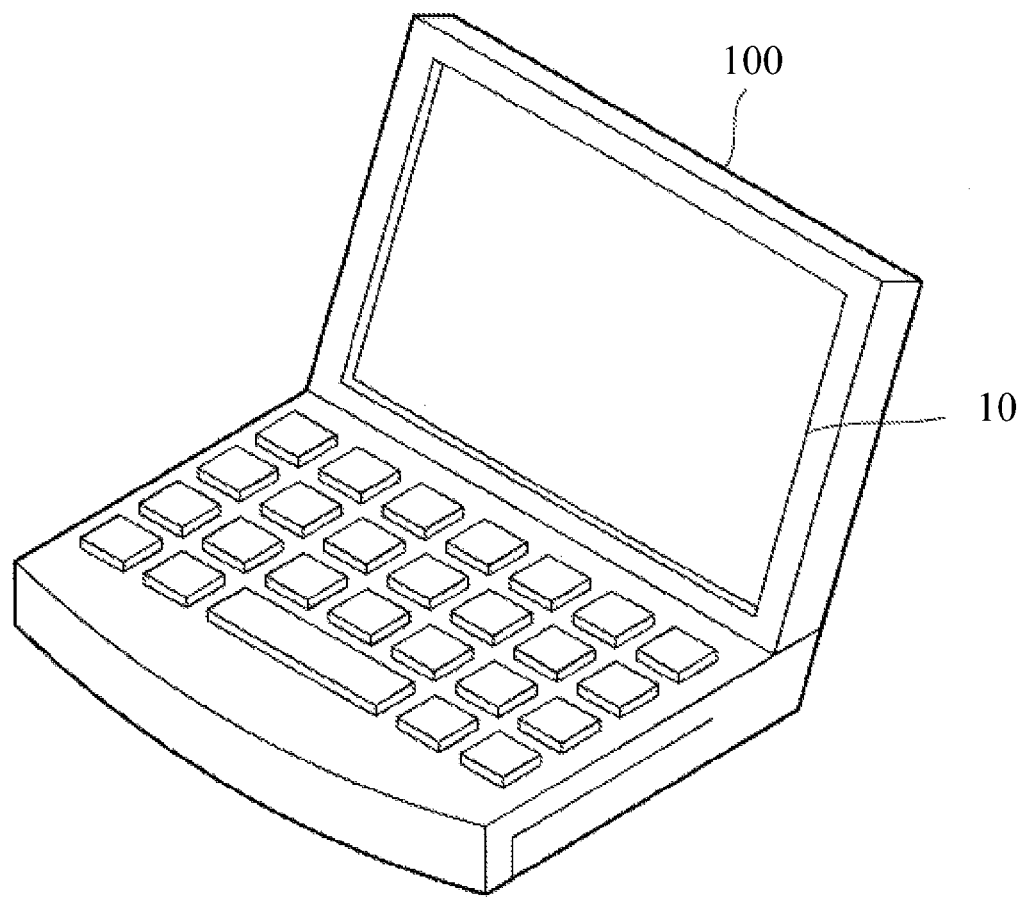
FIG. 1 is a schematic diagram showing an electrical apparatus including a display device according to one embodiment of the present invention.

Referring to FIG. 1, presented herein is a schematic diagram showing an electrical apparatus including a display device according to one embodiment of the present invention. The electrical apparatus 100 shown in FIG. 1 can be a portable computer, and also can be other electrical apparatus including the display device for detecting ambient light, such as a mobile phone, a PDA, a vehicle navigation device or a mobile game console.

Figure 2:
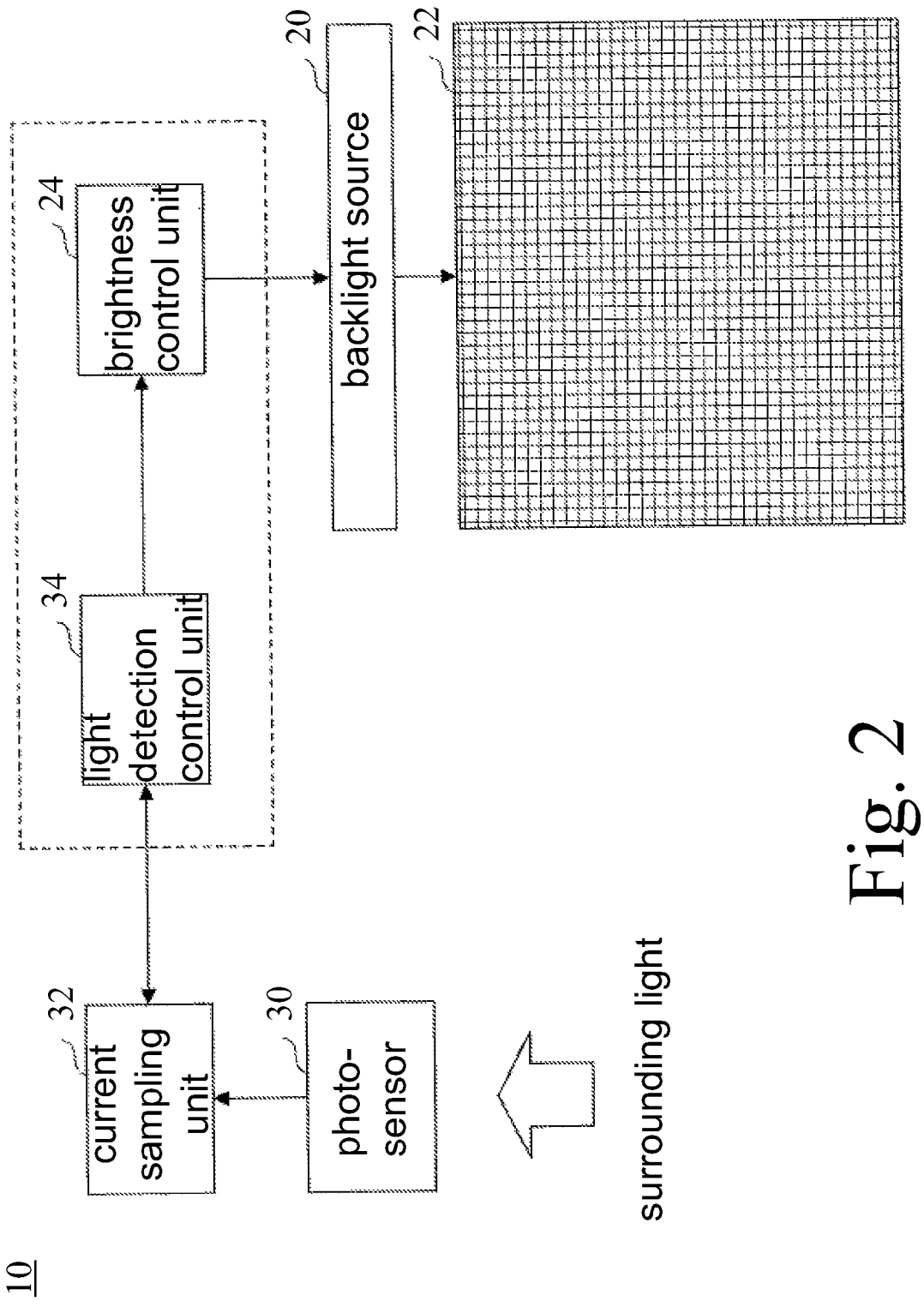
FIG. 2 is a block diagram showing a structure of the display device according to one embodiment of the present invention.

Referring to FIG. 2, presented herein is a block diagram showing a structure of the display device according to one embodiment of the present invention.

The display device 10 shown in FIG. 2 may be a transmissive or transflective LCD comprising a backlight source 20, a LCD module 22 and a brightness control unit 24. The LCD module 22 includes a plurality of LC pixels arranged in a matrix form. The backlight source 20 is disposed at the backside of the LCD module 22 for emitting light to each of the LC pixels. The orientation of LC molecules of the LC pixels can be changed by applying a voltage thereto. The LCD module 22 can allow the light of the backlight source 20 passing through the LC pixels or being sheltered by changing the orientation of the LC molecules, thereby displaying images. The brightness control unit 24 is configured to control lighting of the backlight source 20, such as turning on/off the lighting thereof or regulating the light intensity thereof, thereby regulating the brightness thereof.

Selectively, the display device 10 may also be a display device including an OLED display module. The OLED display module may include a plurality of OLED pixels arranged in a matrix form to replace the LCD module 22. At this time, since the OLED display module is a self-emission type device, the backlight source 20 can be omitted. The brightness control unit 24 can change the driving current of the OLED display module to regulate the brightness thereof.

The display device 10 further comprises a photo-sensor 30, a current sampling unit 32 and a light detection control unit 34. The photo-sensor 30 may be formed on a glass substrate of the LCD module 22 to detect the ambient light and output a photocurrent corresponding to the amount of light that is received by the photo-sensor 30 (i.e. the light intensity). Currently, the photo-sensor 30 can use a photodiode to detect light. The higher the detected light intensity is, the larger the photocurrent is. The current sampling unit is configured to sample a voltage or a digital signal, which is transformed from the photocurrent outputted from the photo-sensor, and to output a plurality of sampling signals to indicate the magnitude of the photocurrent. The light detection control unit 34 is configured to control the current sampling unit 32 to sample photocurrent, and evaluate an average of the sampling signals outputted from the current sampling unit in a predetermined period for providing a detection signal to the brightness control unit 24, wherein the detection signal can indicate the intensity of the ambient light. The brightness control unit 24 regulates the display brightness according to the detection signal provided by the light detection control unit 34.

Referring to the dotted line which is shown in FIG. 2, practically, the brightness control unit 24 and the light detection control unit 34 may be achieved as one piece by a single integrated circuit, such as a logic integrated circuit (IC) or a field programmable gate array (FRGA).

Figure 3:
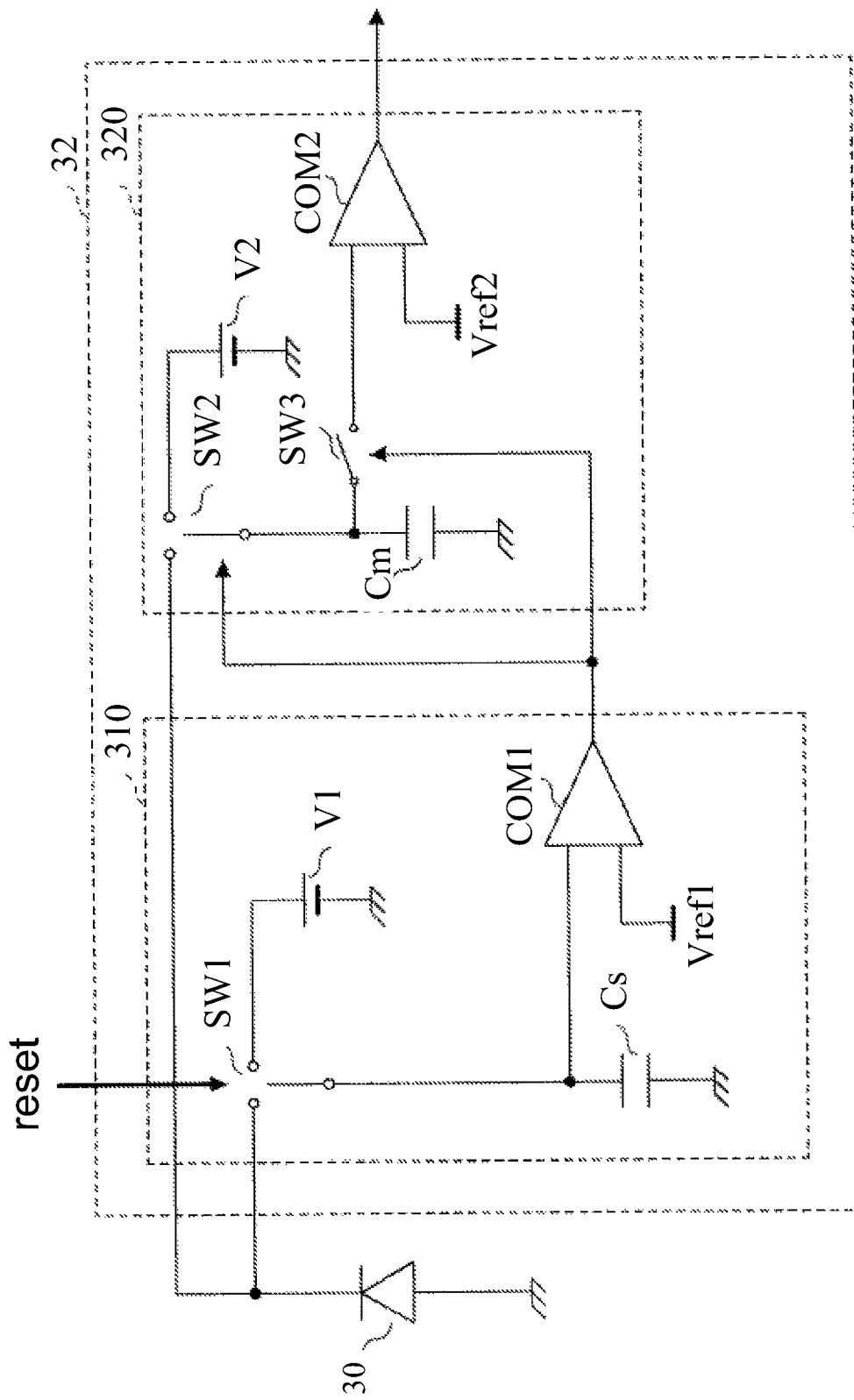
FIG. 3 is a schematic diagram showing a structure of a current sampling unit according to one embodiment of the present invention.

Referring to FIG. 3, presented herein is a schematic diagram showing a structure of the current sampling unit 32 according to one embodiment of the present invention. The current sampling unit 32 shown in FIG. 3 includes a setting unit 310 and a measurement unit 320.

The setting unit 310 is a circuit configured to perform setting up (resetting) for the measurement unit 320. The setting unit 310 includes a direct-current (DC) voltage source V1, a setting capacitor Cs, a comparator COM1 and a switch SW1. The switch SW1 may be a single pole double throw (SPDT) switch. An input terminal of the switch SW1 is coupled to a first terminal of the setting capacitor Cs, and output terminals of the switch SW1 are respectively coupled to the DC voltage source V1 and a cathode of the photodiode which is used to be the photo-sensor 30. The first terminal of the setting capacitor Cs is further coupled to a first terminal of the comparator COM1, and a second terminal of the setting capacitor Cs is coupled to ground. A second terminal of the comparator COM1 is coupled to a reference potential Vref1. In this embodiment, the reference potential Vref1 may be a ground potential.

The switch SW1 performs switching corresponding to a reset signal transmitted from the light detection control unit 34. For example, when the reset signal is at high level, the switch SW1 switches the first terminal of the setting capacitor Cs to be coupled to the power source V1, thereby charging the setting capacitor Cs. Furthermore, when the reset signal is at low level, the switch SW1 switches the first terminal of the setting capacitor Cs to be coupled to the cathode of the photodiode of the photo-sensor 30, thereby allowing the photodiode outputting a current corresponding to the light intensity. The comparator COM1 compares the potential of the setting capacitor Cs with the reference potential Vref1. When the potential of the setting capacitor Cs is discharged to be equal to the ground potential, the comparator COM1 outputs a signal to indicate that a setting period is over.

On the other hand, the measurement unit 320 is a circuit configured to detect the photocurrent (i.e. the intensity of the detected light) outputted from the photo-sensor 30, and to output a result. The measurement unit 320 includes a DC voltage source V2, a measurement capacitor Cm, a comparator COM2 and two switches SW2, SW3. The first switch SW2 may be a SPDT switch. The second switch SW3 may be a single pole single throw (SPST) switch. An input terminal of the first switch SW2 is coupled to a first terminal of the measurement capacitor Cm, and output terminals of the first switch SW2 are respectively coupled to the DC voltage source V2 and the cathode of the photodiode of the photo-sensor 30. The first terminal of the measurement capacitor Cm is further coupled to a first terminal of the comparator COM2 through the second switch SW3, and a second terminal of the measurement capacitor Cm is coupled to ground. A second terminal of the comparator COM2 is coupled to a reference potential Vref2. In this embodiment, the reference potential Vref2 may be a ground potential.

The first switch SW2 and the second switch SW3 perform switching corresponding to the signal transmitted from the comparator COM1. In a stable status, the first switch SW2 switches the first terminal of the measurement capacitor Cm to be coupled to the power source V2, thereby charging the measurement capacitor Cm. However, when the outputted signal of the comparator COM1 is available, the first switch SW2 switches the first terminal of the measurement capacitor Cm to be coupled to the cathode of the photodiode of the photo-sensor 30, thereby allowing the photodiode outputting the current corresponding to the light intensity. In a stable status, the second switch SW3 is turned on. However, when the outputted signal of the comparator COM1 is available, the second switch SW3 switches the first terminal of the measurement capacitor Cm to be coupled to an output terminal of the comparator COM2. Therefore, the comparator COM2 can compare the potential of the measurement capacitor Cm with the reference potential Vref2. When the potential of the measurement capacitor Cm is discharged to be equal to the ground potential, the comparator COM2 outputs a high level pulse signal.

As a result, if the light intensity detected by the photo-sensor 30 is higher, the current sampling unit 32 of the present embodiment can output the pulse signal which has a shorter duration. In the other words, in this embodiment, the duration of the pulse signal is inversely proportional to the light intensity (i.e. the magnitude of the photocurrent). Therefore, by observing the duration of the pulse signal, the intensity of the ambient light detected by the photo-sensor 30 is evaluated.

Furthermore, the structure shown in FIG. 3 is merely an embodiment, and the current sampling unit 32 can also be formed by other structures. For example, when the light intensity detected by the photo-sensor 30 is higher, the current sampling unit 32 may output the pulse signal which has a longer duration. In the other words, at this time, the duration of the pulse signal is positively proportional to the light intensity (i.e. the magnitude of the photocurrent).

Figure 4:
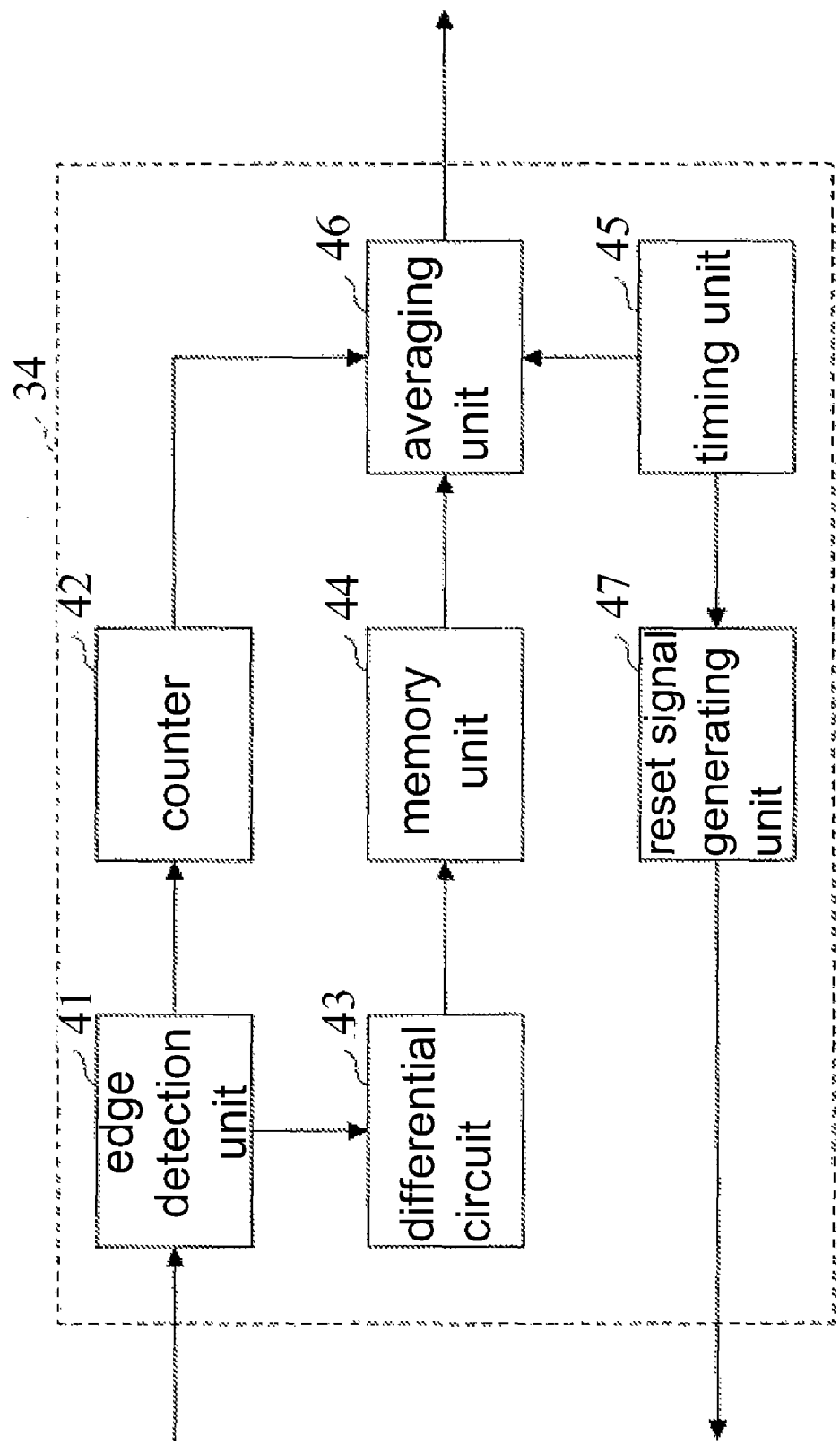
FIG. 4 is a schematic diagram showing a structure of a light detection control unit according to one embodiment of the present invention.

Referring to FIG. 4, presented herein is a schematic diagram showing a structure of the light detection control unit 34 according to one embodiment of the present invention.

The light detection control unit 34 shown in FIG. 4 includes an edge detection unit 41, a counter 42, a differential circuit 43, a memory unit 44, a timing unit 45, an averaging unit 46 and a reset signal generating unit 47. The edge detection unit 41 can detect a start and an end of the pulse signal. The counter 42 can counts the number of the start or the end detected by the edge detection unit 41. The differential circuit 43 can evaluate time differentials between the starts and the ends detected by the edge detection unit 41, thereby evaluating the durations of the pulse signals (further called 'pulse width PW'). The memory unit 44 can store the pulse width PW evaluated by the differential circuit 43. The timing unit 45 can evaluate a predetermined light detection time of light detecting. The averaging unit 46 can receive a signal transmitted by the timing unit 45 after evaluating the predetermined time, and read the all pulse width PW stored by the memory unit 44 in the predetermined time, and use the number counted by the counter 42 to evaluate an average value of the pulse width PW. The reset signal generating unit 47 is configured to generate a reset signal, which is provided to the current sampling unit 32 at the start of a sampling period, and the sampling period is shorter than the predetermined light detection time. Therefore, the timing unit 45 can further evaluate the time of the sampling period.

Figure 5A:
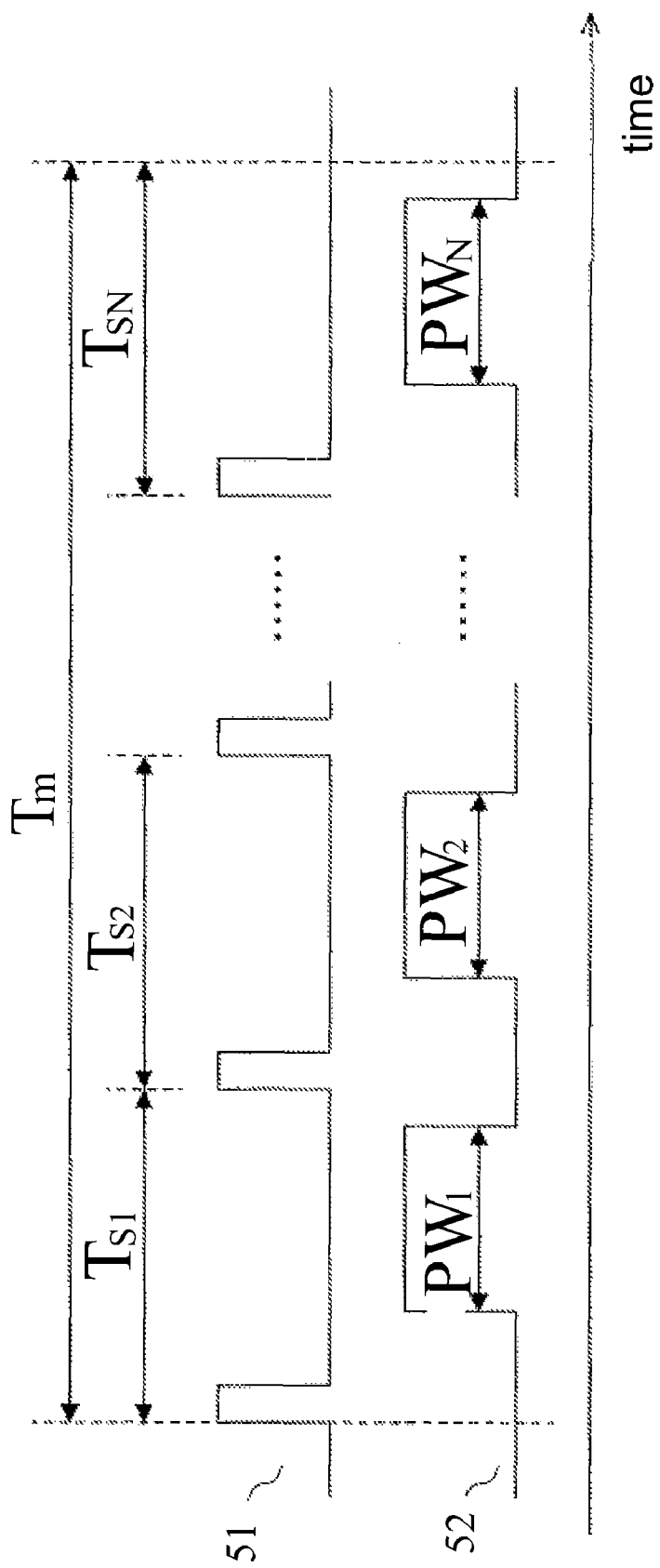
FIG. 5A is a schematic diagram showing a description of using the display device to detect light according to a first embodiment of the present invention.

Referring to FIG. 5A, presented herein is a schematic diagram showing a description of using the display device to detect light according to a first embodiment of the present invention. In detecting light described in FIG. 5A, the detected light is stable and has a constant intensity, such as sunlight.

In FIG. 5A, a line 51 shows the reset signal which is provided from the light detection control unit 34 to the current sampling unit 32, and a line 52 shows the sampling signals (pulse signals in this embodiment) outputted by the current sampling unit 32. In the present embodiment, the light detecting using the display device is performed in the predetermined light detection time Tm. Therefore, the photocurrent outputted by the photo-sensor 30 is sampled in the predetermined time Tm with a predetermined number N of sampling times, and the light detection control unit 34 provides the reset signal in each constant period Ts, which is shorter than the predetermined light detection time Tm. The constant period between providing the reset signal and providing next reset signal is generally called as the sampling period. For example, when the light detection time Tm is 100 ms and the desired number N of sampling times is 10, each sampling period $Ts_1, Ts_2 \ldots Ts_N$ is equal to 10 ms.

In a sampling period $Ts_i$ (where i is an arbitrary number between 1 and N), the current sampling unit 32 receives the reset signal provided by the light detection control unit 34 and outputs the pulse signal with the pulse width $PW_i$ after the setting period. The setting period is evaluated by the capacitance of the setting capacitor Cs. The pulse width $PW_i$ corresponds to the light intensity detected by the photo-sensor 30, and does not only relate to the light intensity, but also relates to the capacitance of the measurement capacitor Cm. Therefore, according to the display device of this embodiment, the capacitance of the measurement capacitor Cm needs to be selected properly, thereby allowing pulse width $PW_i$ being contained in the predetermined continued period of the sampling period $Ts_i$.

The pulse signal outputted by the current sampling unit 32 is received by the light detection control unit 34. The light detection control unit 34 uses the edge detection unit 41 to detect the start and the end of the pulse signal, and uses the differential circuit 43 to evaluate the pulse width $PW_i$, and store it in the memory unit 44. Furthermore, in the counter 42 of the light detection control unit 34, the start or the end of the pulse signal is counted as one time, i.e. the counter 42 can count the number of the sampling time. The light detection control unit 34 includes the timing unit 45 to evaluate the time of the sampling period $Ts_1, Ts_2 \ldots Ts_N$ and the time of the light detection time Tm. After the light detection time Tm, the light detection control unit 34 uses the averaging unit 46 to read and sum up the all pulse width $PW_1, PW_2 \ldots PW_N$ stored in the memory unit 44, and the sum of the pulse width $PW_1, PW_2 \ldots PW_N$ is divided by the number N counted by the counter 42. As a result, the light detection control unit 34 can evaluate an average value PW(AVG) of the pulse width and provide it to the brightness control unit 24. The brightness control unit 24 can regulate the brightness of the backlight source 20, or change the driving current of the OLED display module to regulate the brightness thereof according to the average value PW(AVG) of the pulse width provided by the light detection control unit 34.

As described above, in the present embodiment, since the detected light has a constant intensity, in each sampling period $Ts_1$, $Ts_2$ ... $Ts_N$, the pulse width $PW_1$, $PW_2$ ... $PW_N$ is identical, i.e. $PW_1 = PW_2 = PW_N = PW(AVG)$.

Figure 5B:
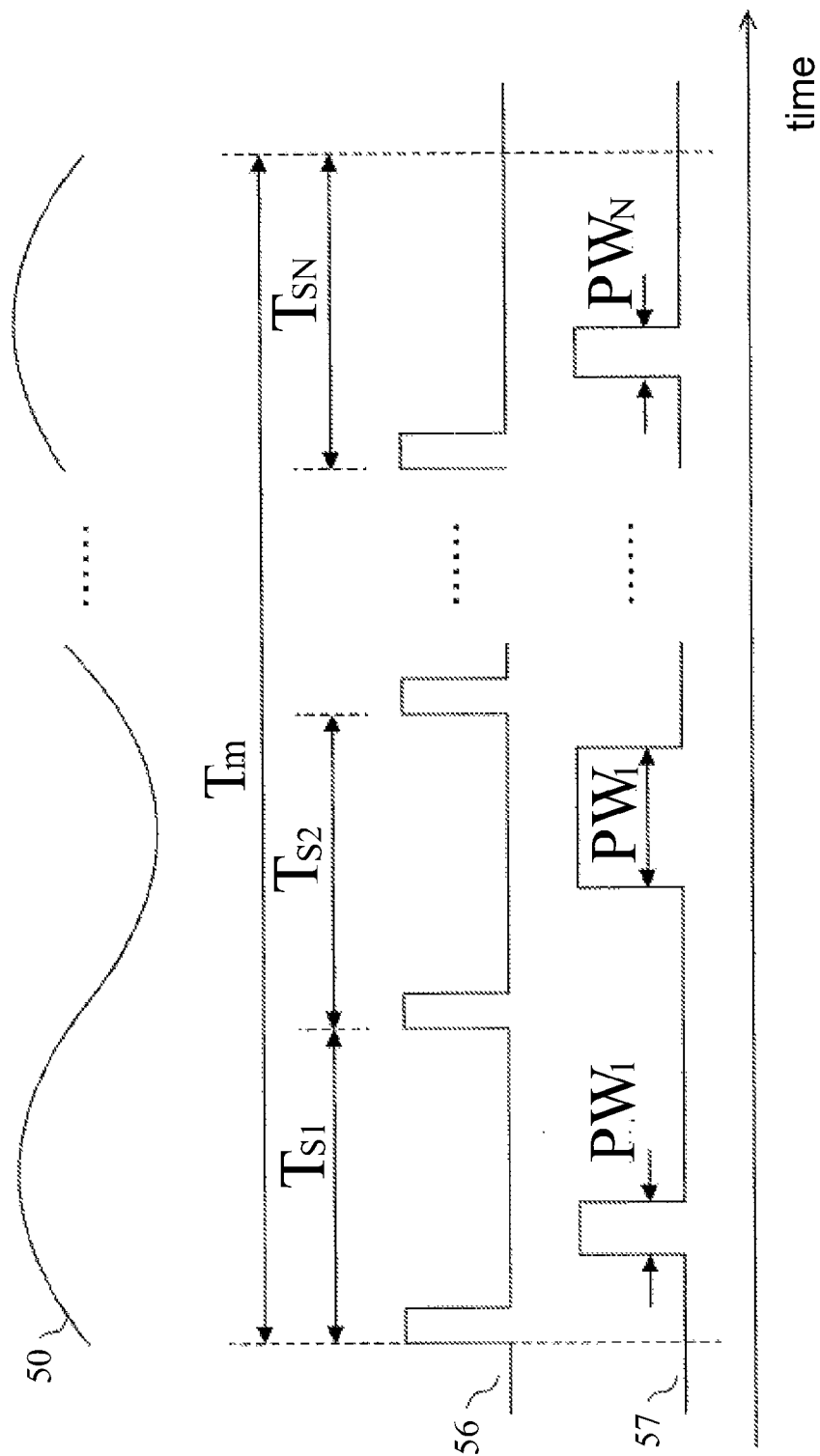
FIG. 5B is a schematic diagram showing a description of using the display device to detect light according to a second embodiment of the present invention.

Referring to FIG. 5B, presented herein is a schematic diagram showing a description of using the display device to detect light according to a second embodiment of the present invention. In detecting light described in FIG. 5B, the detected light is emitted by a fluorescent lamp with a predetermined driving frequency and has a varied intensity.

In FIG. 5B, a line 56 shows the reset signal which is provided from the light detection control unit 34 to the current sampling unit 32, and a line 57 shows the sampling signals (pulse signals in this embodiment) outputted by the current sampling unit 32. Furthermore, in FIG. 5B, for reference, the variation of the intensity of the detected light (line 50) is shown. In the present embodiment, the light detecting using the display device is also performed in the predetermined light detection time Tm. Therefore, the photocurrent outputted by the photo-sensor 30 is sampled in the predetermined time Tm with a predetermined number N of sampling times, and the light detection control unit 34 provides the reset signal in each constant period Ts, which is shorter than the predetermined light detection time Tm.

In this embodiment, the difference compared to the above-mentioned embodiment in FIG. 5A is that the light 50 detected by the photo-sensor 30 does not have a constant intensity. Accordingly, in each sampling period $Ts_1$, $Ts_2$ ... $Ts_N$, the pulse width $PW_1$, $PW_2$ ... $PW_N$ varies with the varied intensity. For example, referring to FIG. 5B, in a first sampling period $Ts_1$, the light intensity is transiently raised, thereby outputting a pulse signal with a shorter pulse width $PW_1$. In the other hand, in a second sampling period $Ts_2$, the light intensity is transiently reduced, thereby outputting a pulse signal with a longer pulse width $PW_2$.

Therefore, in each sampling period $Ts_1$, $Ts_2$•••$Ts_N$, the pulse width $PW_1$, $PW_2$ ... $PW_N$ of the pulse signal varies with the intensity of the detected light. However, the detection signal provided to the brightness control unit 24 for indicating the light intensity detected by the photo-sensor 30 is the average value PW(AVG) of the pulse width. In the predetermined light detection time Tm, the sum of the pulse width $PW_1$, $PW_2$ ... $PW_N$ is divided by the number N of the sampling times $Ts_1$, $Ts_2$ ... $Ts_N$, thereby obtaining the average value PW(AVG) of the pulse width. By averaging the pulse width, the effect of the variation of the light intensity on the light detecting result can be reduced.

When the light intensity is lower, the pulse width $PW_1$, $PW_2$ ... $PW_N$ of the outputted pulse signal in each sampling period $Ts_1$, $Ts_2$ ... $Ts_N$ is longer, and the accuracy of light detecting can be enhanced by averaging the pulse width. However, when the light intensity is higher, the pulse width $PW_1$, $PW_2$ ... $PW_N$ of the outputted pulse signal in each sampling period $Ts_1$, $Ts_2$ ... $Ts_N$ is shorter, and thus the effect of the variation of the light intensity on the light detecting result occurs even if the pulse width is averaged. For solving this problem, FIG. 6 shows a structure of a light detection control unit 34' according to another embodiment of the present invention.

Figure 6:
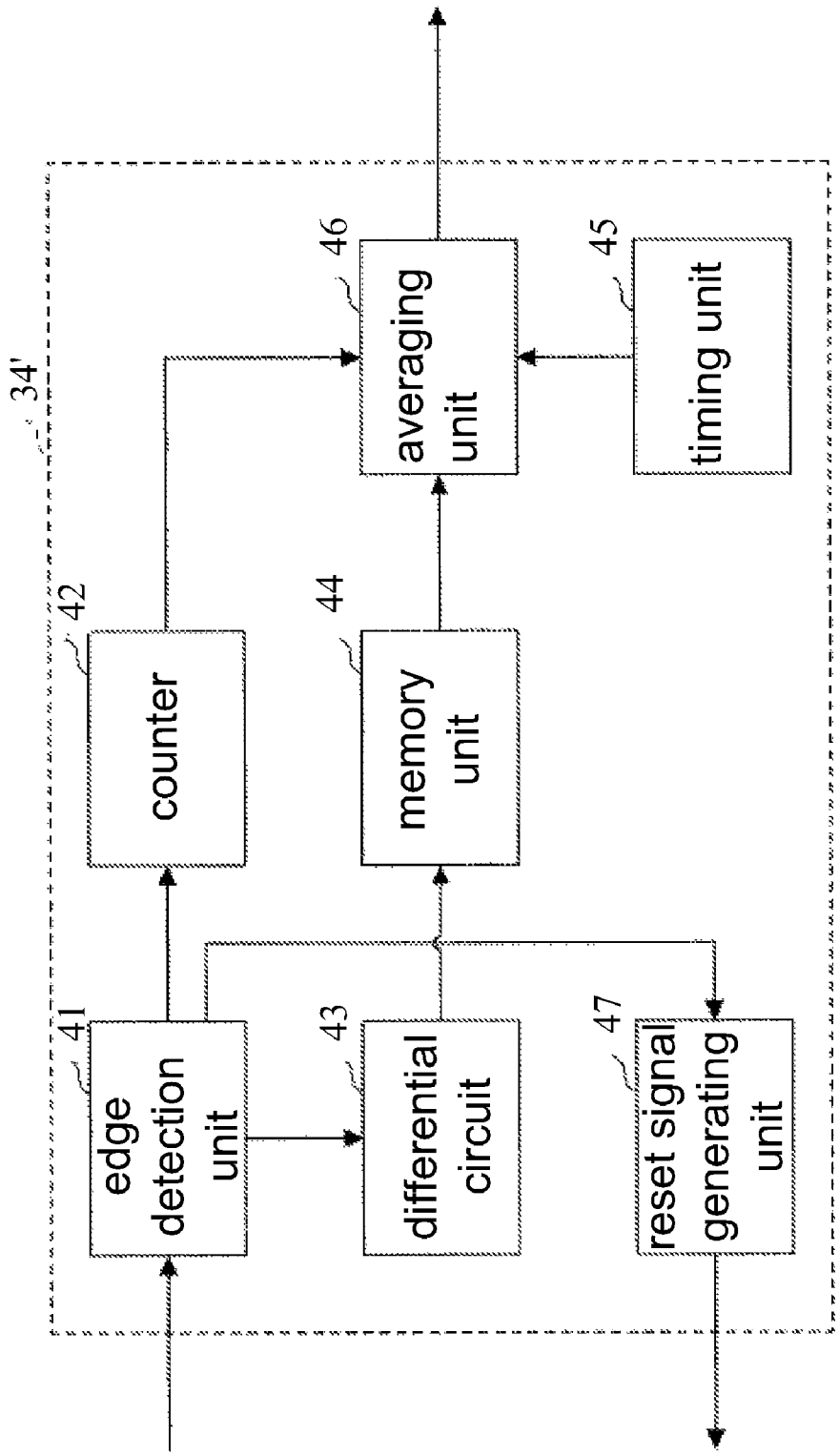
FIG. 6 is a schematic diagram showing a structure of the light detection control unit according to another embodiment of the present invention.

Referring to FIG. 6, presented herein is a schematic diagram showing a structure of the light detection control unit 34' according to another embodiment of the present invention. Comparing with the above-mentioned light detection control unit 34 shown in FIG. 4, the reset signal generating unit 47 of the light detection control unit 34' shown in FIG. 6 provides the reset signal corresponding to the ends of the sampling signals detected by the edge detection unit 41. As a result, the duration of each sampling period is varied, and the number of the sampling times is also varied. The light detecting of the display device including the light detection control unit 34' is shown in FIG. 7.

Figure 7:
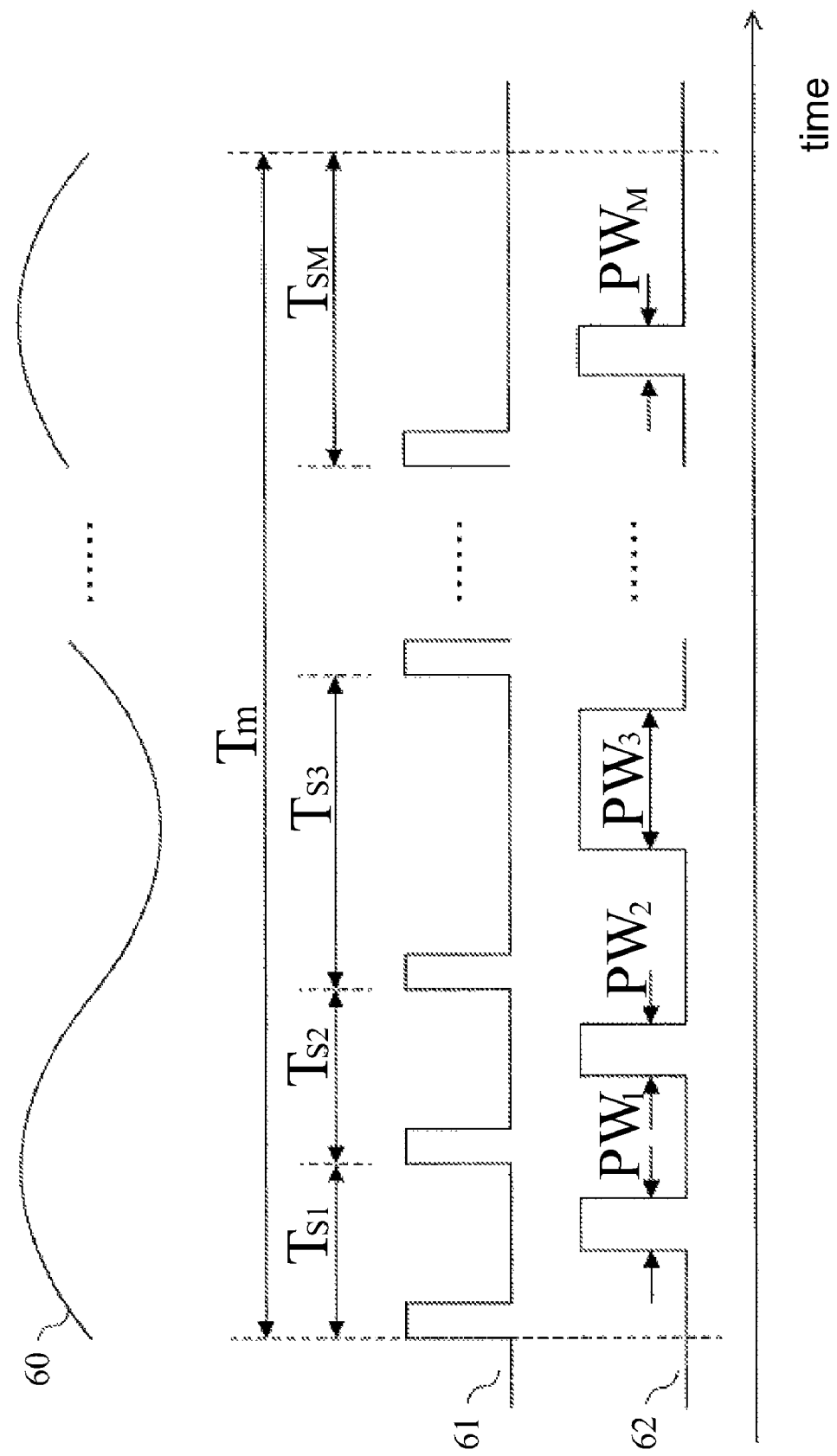
FIG. 7 is a schematic diagram showing a description of using the display device to detect light according to another embodiment of the present invention.

Referring to FIG. 7, presented herein is a schematic diagram showing a description of using the display device to detect light according to another embodiment of the present invention. Similar to the above-mentioned detecting shown in FIG. 5, in the light detecting described in FIG. 7, the detected light (line 60) is emitted by a fluorescent lamp with a predetermined driving frequency and has a varied intensity.

In FIG. 7, a line 61 shows the reset signal which is provided from the light detection control unit 34' to the current sampling unit 32, and a line 62 shows the sampling signals (pulse signals in this embodiment) outputted by the current sampling unit 32. In the present embodiment, the light detecting using the display device is also performed in the predetermined light detection time Tm. However, the period between providing the reset signal and providing next reset signal, i.e. the duration of the sampling period, is not constant. Therefore, the number of the sampling times is not limited to N. For example, in this embodiment, the final number of the sampling times is M.

In a sampling period $Ts_i$ (i is an arbitrary number between 1 and M), the current sampling unit 32 receives the reset signal provided by the light detection control unit 34' and outputs the pulse signal with the pulse width $PW_i$ after the setting period. The setting period is evaluated by the capacitance of the setting capacitor Cs. The pulse width $PW_i$ corresponds to the intensity of the light 60 detected by the photo-sensor 30.

The pulse signal outputted by the current sampling unit 32 is received by the light detection control unit 34'. The light detection control unit 34' uses the edge detection unit 41 to detect the start and the end of the pulse signal, and uses the differential circuit 43 to evaluate the pulse width $PW_i$, and stores it in the memory unit 44. Furthermore, in the counter 42 of the light detection control unit 34', the start or the end of the pulse signal is counted as one time, i.e. the counter 42 can count the number of the sampling time. Furthermore, when the edge detection unit 41 detects the end of the pulse signal, the light detection control unit 34' uses the reset signal generating unit 47 to provide the reset signal to the current sampling unit 32, and the current sampling unit 32 receives the reset signal and starts the next sampling period $Ts_{i+1}$.

The light detection control unit 34' includes the timing unit 45 to evaluate the time of the light detection time Tm. At this time, the final number of the sampling times counted by the counter 42 is M. After the light detection time Tm, the light detection control unit 34' uses the averaging unit 46 to read and sum up the all pulse width $PW_1$, $PW_2$ ... $PW_M$ stored by the memory unit 44, and the sum of the pulse width $PW_1$, $PW_2$ ... $PW_M$ is divided by the number M counted by the counter 42. As a result, the light detection control unit 34' can evaluate an average value PW(AVG) of the pulse width and provide it to the brightness control unit 24. The brightness control unit 24 can regulate the brightness of the backlight source 20, or change the driving current of the OLED display module to regulate the brightness thereof according to the average value PW(AVG) of the pulse width.

As described above, in the present embodiment, the photo-sensor can detect the light 60 which has a varied intensity due to varied reasons. Therefore, the pulse width $PW_1$, $PW_2$ ... $PW_M$ of the pulse signal varies with the light, and the duration of each sampling period $Ts_1$, $Ts_2$ ... $Ts_M$ and the number M of the sampling times are also varied. For example, referring to FIG. 7, in a first sampling period $Ts_1$ and a second sampling period $Ts_2$, the light intensity is transiently raised, thereby outputting pulse signals with shorter pulse widths $PW_1$, $PW_2$. In a third sampling period $Ts_3$, the light intensity is transiently reduced, thereby outputting a pulse signal with a longer pulse width $PW_3$. The durations of the first and the second sampling period $Ts_1$, $Ts_2$ are shorter than the duration of the third sampling period $Ts_3$.

Therefore, the duration of the sampling period can correspond to the pulse width of the pulse signal. The higher the light intensity is, the more the number of the sampling times in the predetermined time is. Accordingly, when the light intensity is higher, the pulse width $PW_1$, $PW_2$ ... $PW_M$ is shorter, and thus the effect of the variation of the light intensity on the light detecting result can be reduced.

Figure 8:
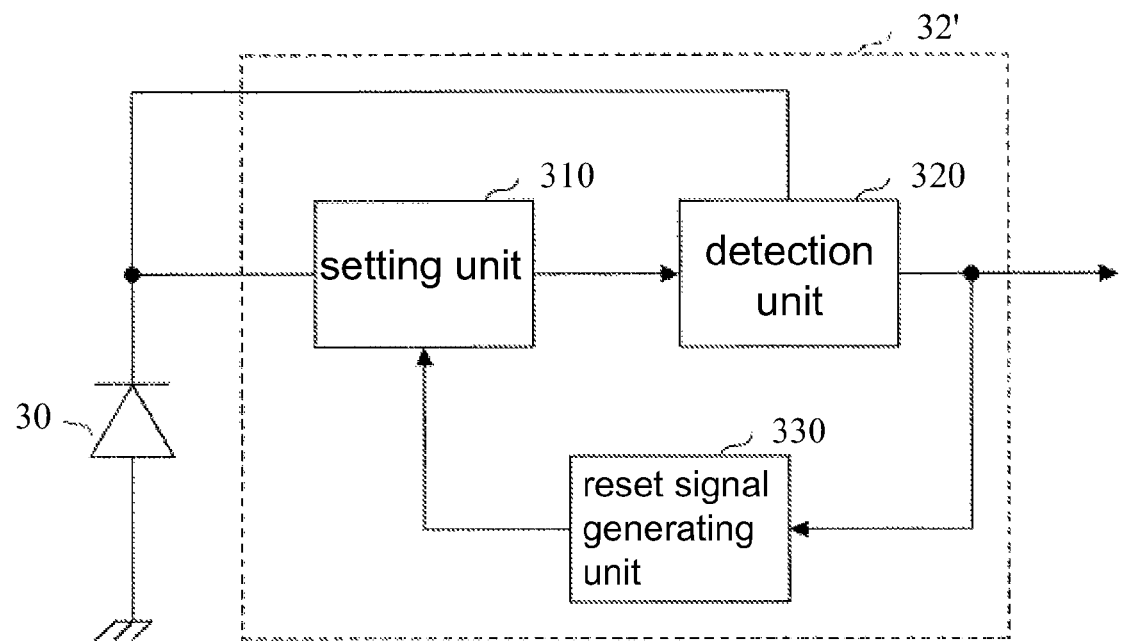
FIG. 8 is a schematic diagram showing the structure of the current sampling unit according to another embodiment of the present invention.

Selectively, the above-mentioned detecting shown in FIG. 7 can be also achieved by a structure of the current sampling unit shown in FIG. 8.

Referring to FIG. 8, presented herein is a schematic diagram showing the structure of the current sampling unit 32' according to another embodiment of the present invention. Comparing with the above-mentioned current sampling unit 32 shown in FIG. 3, the current sampling unit 32' includes a reset signal generating unit 330. The reset signal generating unit 330 can detect the end of the pulse signal outputted by the comparator COM2 of the measurement unit 320. When the end of the pulse signal is detected, the reset signal generating unit 330 can generate the reset signal to be provided to the setting unit 310. Therefore, at this time, the reset signal generating unit 47 of the light detection control unit 34' can be omitted.

As is understood by a person skilled in the art, the foregoing embodiments of the present invention are strengths of the present invention rather than limiting of the present invention. It is intended to cover various modifications and similar arrangements included within the spirit and scope of the appended claims, the scope of which should be accorded the broadest interpretation so as to encompass all such modifications and similar structures.

For example, in the above-mentioned embodiments, referring to FIG. 5A, FIG. 5B and FIG. 7, although the current sampling unit outputs the high level pulse signal corresponding to the light intensity detected by the photo-sensor, a low level pulse signal can be also outputted. When using the current sampling unit to perform light detecting described in FIG. 7, the reset signal is generated corresponding to the start of the pulse signal outputted by the current sampling unit.

What is claimed is:

1. A display device including a photo-sensor for detecting ambient light and outputting a photocurrent according to the intensity of the ambient light, wherein the display device comprises:
a current sampling unit configured to sample the photocurrent outputted from the photo-sensor and to output a plurality of sampling signals to indicate a magnitude of the photocurrent; and
a light detection control unit configured to evaluate an average of the sampling signals outputted from the current sampling unit in a predetermined period;
wherein the current sampling unit starts a next sampling period corresponding to an end of one of the sampling signals, and
wherein the light detection control unit comprises:
an edge detection unit configured to detect an edge of the sampling signals;
a reset signal generating unit configured to generate a reset signal when the edge detection unit detects the end of one of the sampling signal, thereby allowing the current sampling unit to start the next sampling period;
a counter configured to count the number of starts or ends of the sampling signals detected by the edge detection unit;
a differential circuit configured to determine time differentials representing pulse widths between the starts and the ends of the sampling signals detected by the edge detection unit;
a memory unit configured to store the time differentials determined by the differential circuit;
a timing unit configured to determine a time of the predetermined period when the current sampling unit starts to sample the photocurrent; and
an averaging unit configured to determine a sum of the time differentials stored by the memory unit in the predetermined period when passing the predetermined period, and to divide the sum into the number counted by the counter, thereby determining the average of the sampling signals.

2. The display device of claim 1, wherein a duration of the sampling signals outputted by the current sampling unit is positively proportional to the magnitude of the photocurrent.

3. The display device of claim 1, wherein a duration of the sampling signals outputted by the current sampling unit is inversely proportional to the magnitude of the photocurrent.

4. The display device of claim 1, further comprising:
a brightness control unit configured to regulate a display brightness according to the average of the sampling signals determined by the light detection control unit.

5. The display device of claim 1, wherein the display device is a transmissive liquid crystal display (LCD), a transflective LCD or an organic light emission diode (OLED) display device.

6. An electrical apparatus comprising the display device of claim 1.

7. A display device including a photo-sensor for detecting ambient light and outputting a photocurrent according to the intensity of the ambient light, wherein the display device comprises:
a current sampling unit configured to sample the photocurrent outputted from the photo-sensor and to output a plurality of sampling signals to indicate a magnitude of the photocurrent; and
a light detection control unit configured to evaluate an average of the sampling signals outputted from the current sampling unit in a predetermined period;
wherein the current sampling unit starts a next sampling period corresponding to an end of one of the sampling signals,
wherein the current sampling unit detects ends of the sampling signals and comprises a reset signal generating unit configured to generate a reset signal corresponding to the end of one of the sampling signals, thereby allowing the current sampling unit to start the next sampling period, and
wherein the light detection control unit comprises:
an edge detection unit configured to detect an edge of the sampling signals;
a counter configured to count the number of starts or ends of the sampling signals detected by the edge detection unit;
a differential circuit configured to determine time differentials representing pulse widths between the starts and the ends of the sampling signals detected by the edge detection unit;

a memory unit configured to store the time differentials determined by the differential circuit;

a timing unit configured to determine a time of the predetermined period when the current sampling unit starts to sample the photocurrent; and an averaging unit configured to determine a sum of the time differentials stored by the memory unit in the predetermined period when passing the predetermined period, and to divide the sum into the number counted by the counter, thereby determining the average of the sampling signals.

8. The display device of claim 7, wherein a duration of the sampling signals outputted by the current sampling unit is positively proportional to the magnitude of the photocurrent.

9. The display device of claim 7, wherein a duration of the sampling signals outputted by the current sampling unit is inversely proportional to the magnitude of the photocurrent.

10. The display device of claim 7, further comprising:
a brightness control unit configured to regulate a display brightness according to the average of the sampling signals determined by the light detection control unit.

11. The display device of claim 7, wherein the display device is a transmissive liquid crystal display (LCD), a transflective LCD or an organic light emission diode (OLED) display device.

12. An electrical apparatus comprising the display device of claim 7.

13. A display device including a photo-sensor for detecting ambient light and outputting a photocurrent according to the intensity of the ambient light, wherein the display device comprises:
a current sampling unit configured to sample the photocurrent outputted from the photo-sensor and to output a plurality of sampling signals to indicate a magnitude of the photocurrent; and a light detection control unit configured to evaluate an average of the sampling signals outputted from the current sampling unit in a predetermined period;

wherein the current sampling unit starts a next sampling period corresponding to an end of one of the sampling signals, and wherein the light detection control unit comprises:
an edge detection unit configured to detect an edge of the sampling signals;

a counter configured to count the number of starts or ends of the sampling signals detected by the edge detection unit;

a differential circuit configured to determine time differentials representing pulse widths between the starts and the ends of the sampling signals detected by the edge detection unit;

a memory unit configured to store the time differentials determined by the differential circuit;

a timing unit configured to determine a time of the predetermined period when the current sampling unit starts to sample the photocurrent;

a reset signal generating unit configured to generate a reset signal at a start of each sampling period determined by the timing unit, thereby allowing the current sampling unit to start the next sampling period; and an averaging unit configured to determine a sum of the time differentials stored by the memory unit in the predetermined period when passing the predetermined period, and to divide the sum into the number counted by the counter, thereby determining the average of the sampling signals.

14. The display device of claim 13, wherein a duration of the sampling signals outputted by the current sampling unit is positively proportional to the magnitude of the photocurrent.

15. The display device of claim 13, wherein a duration of the sampling signals outputted by the current sampling unit is inversely proportional to the magnitude of the photocurrent.

16. The display device of claim 13, further comprising:
a brightness control unit configured to regulate a display brightness according to the average of the sampling signals determined by the light detection control unit.

17. The display device of claim 13, wherein the display device is a transmissive liquid crystal display (LCD), a transflective LCD or an organic light emission diode (OLED) display device.

18. An electrical apparatus comprising the display device of claim 13.

* * * * *